Jan. 6, 1953   J. F. BYRNE   2,624,780
MEASURING SYSTEM
Filed Dec. 11, 1948   5 Sheets-Sheet 1

INVENTOR
JOHN F. BYRNE
BY
Blair, Curtis & Hayward
ATTORNEYS

Jan. 6, 1953   J. F. BYRNE   2,624,780
MEASURING SYSTEM

Filed Dec. 11, 1948   5 Sheets-Sheet 3

INVENTOR
JOHN F. BYRNE
BY
Blair, Curtis & Hayward.
ATTORNEYS

Jan. 6, 1953    J. F. BYRNE    2,624,780
MEASURING SYSTEM

Filed Dec. 11, 1948    5 Sheets-Sheet 4

INVENTOR
JOHN F. BYRNE

BY
Blair, Curtis & Hayward
ATTORNEYS

Jan. 6, 1953 J. F. BYRNE 2,624,780
MEASURING SYSTEM
Filed Dec. 11, 1948 5 Sheets-Sheet 5
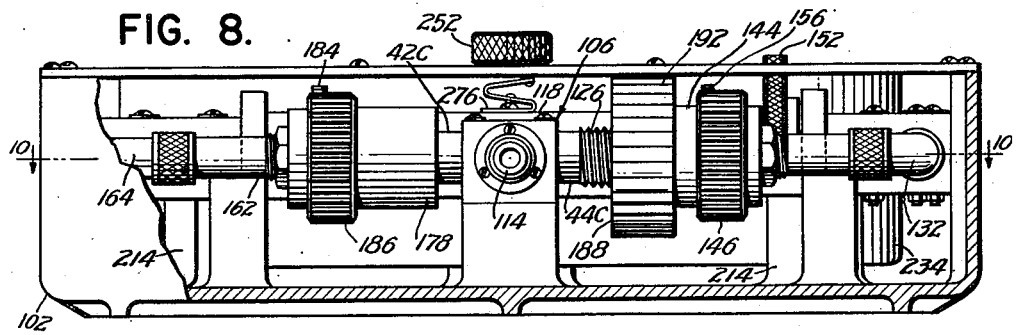
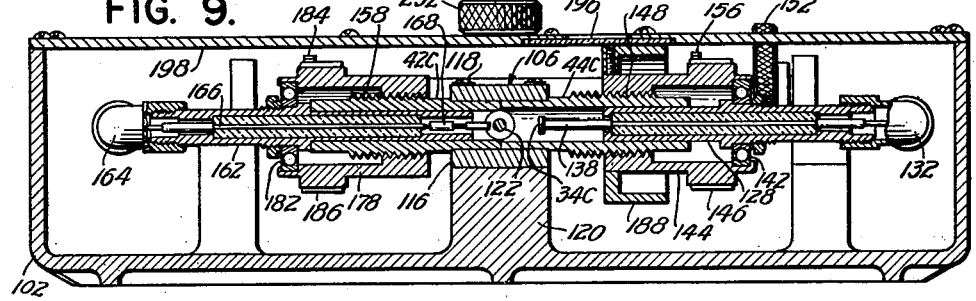
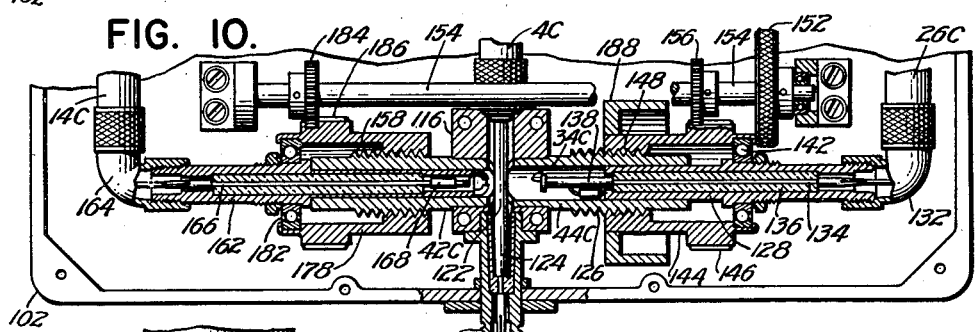
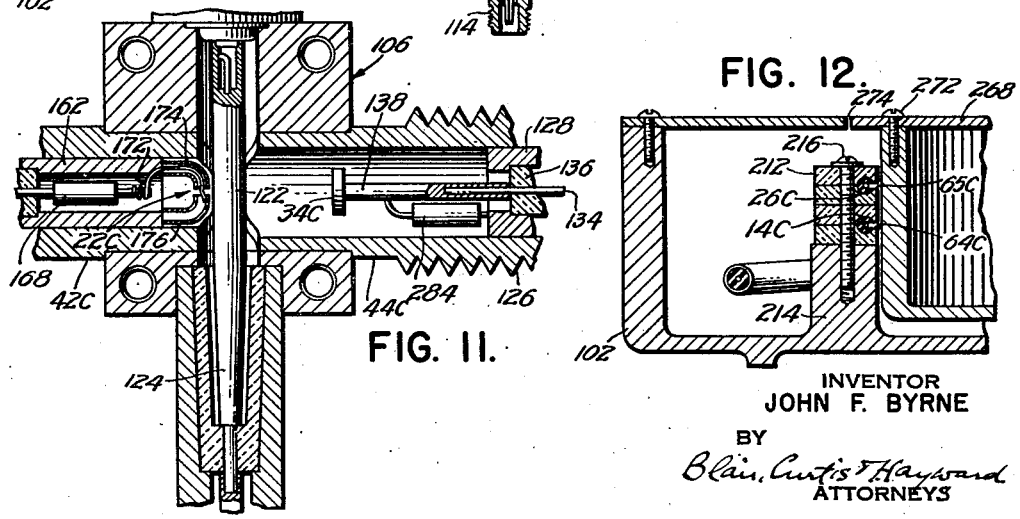
INVENTOR
JOHN F. BYRNE
BY
Blair, Curtis & Hayward
ATTORNEYS Patented Jan. 6, 1953

2,624,780

UNITED STATES PATENT OFFICE 2,624,780

MEASURING SYSTEM

John F. Byrne, Garden City, N. Y., assignor, by mesne assignments, to Hewlett-Packard Company, Palo Alto, Calif., a corporation of California Application December 11, 1948, Serial No. 64,871

18 Claims. (Cl. 175—183)

This invention relates to systems for measuring electrical characteristics. More particularly it relates to methods and apparatus for determining the impedance characteristics of electrical components or circuits at high frequencies.

In recent years, high frequency systems have been employed in an ever increasing number of applications, and the study and design of such apparatus is being conducted on a wide scale in many separate fields. Thus, the rapid and accurate measurements of the characteristics of such apparatus and the individual circuits and components incorporated therein is assuming ever increasing importance.

In alternating current circuits, it is the "impedance" that determines the flow of the alternating current and the distribution of voltages in the circuit; and the present invention is directed to the measurement of the value of this impedance, particularly in high frequency circuits. Such measurements are an important step in the design of almost all high frequency apparatus; for example, in designing a home television receiving system, careful consideration must be given to the impedance characteristics of the antenna, the transmission line, and the input circuit of the television receiver over the entire operating range of frequencies. If these impedance characteristcs are not selected properly, the system may have high losses and only a small portion of the signal available at the antenna can be utilized at the receiver.

Such impedance measurements have been made frequently in the past by the use of slotted coaxial transmission lines or slotted wave guides. In the slotted line system, a signal generator, or other source of electrical energy of the desired frequency, is connected to one end of the slotted line, and the component which is to be measured is connected to form a termination at the opposite end of the slotted line. The magnitude of the signal from a small pick-up probe, arranged to extend through the slot into the interior of the transmission line and responsive to either the voltage or the current along the slotted line, is indicated by a suitable instrument. By sliding the probe along the line, the position and relative magnitudes of the standing waves on the slotted line can be measured. The impedance of the terminating element can be calculated from these measurements and the known characteristics of the slotted line.

Although the technique involved in such measurements does not appear particularly complicated, it has been found in practice that to make satisfactory measurements by this method requires carefully designed apparatus and skillful and tedious operation.

For example, the response of the pick-up or detector probe may not be constant for different frequencies and may not be linear with changes in amplitude; therefore, it is necessary that the response characteristics of the probe and indicator system be accurately known and taken into account in these computations. Furthermore, it is necesary that these response characteristics be stable over long periods of time. The slotted line must be constructed rigidly and installed so that there is no distortion of the line during the measurements, and the characteristics of the slotted line must be uniform throughout its length so that no reflections or dicontinuities will be caused by the slotted line itself. Moreover, the slotted portion of the line must have a minimum length of at least one-half wave length at the lowest frequency to be measured, and preferably should be appreciably longer. For example, if measurements are to be made at 100 megacycles, the slotted portion must have a length of five feet or more. Moreover, the source of radio frequency power which is utilized for the measurements must be stable so that the amplitude of the voltage on the slotted line will remain constant throughout the measuring sequence. The construction and installation of such a slotted line is relatively expensive and the installation necessarily is permanent, so that the slotted line and its associated equipment occupy at all times a relatively large area of valuable laboratory space.

The present invention is embodied in a compact laboratory unit of the null-indicating type which overcomes, in a large measure, the disadvantages of earlier impedance measuring systems and which in most applications can be calibrated so as to eliminate lengthy and complex calculations.

Accordingly, it is an object of this invention to provide improved methods and apparatus for making impedance measurements quickly and accurately.

Another object is to provide such methods and apparatus whereby impedance measurements at high frequencies may be made by relatively unskilled personnel following simple instructions.

Still another object is to reduce the expense involved in making such impedance measurements by reducing the initial cost of the equipment and the operating expense.

Still another object is to provide such apparatus which may be calibrated quickly and accurately without expensive precision type auxiliary equipment.

Still another object is to provide such a system in which the accuracy may be determined quickly at any time by simple open and short-circuit measurements.

Another object is to provide such apparatus arranged in compact form convenient for laboratory use and from which impedance values can be obtained without extensive calculations.

Still another object is to provide such apparatus in a form convenient for portable use and which may be stored away when not in use, thus saving valuable laboratory space.

It is still another object to provide such a measuring system in which the measurements are independent of amplitude variations of the signal utilized for the measurements, thus permitting the use of less expensive signal generators.

These and other objects, some of which relate to the entire apparatus and others of which relate to novel arrangements forming part of the apparatus, will be in part apparent from, and in part pointed out in, the following description taken together with the accompanying drawings in which:

Fig. 8 is a front view of the apparatus shown in Fig. 5, with a portion of the case cut away to show the internal components;

Fig. 9 is a section taken along line 9—9 of Fig. 6;

Fig. 10 is a section taken along lines 10—10 of Figs. 7 and 8;

Fig. 11 is an enlarged view of the central portion of Fig. 10; and

Fig. 12 is an enlarged partial section taken along line 12—12 of Fig. 6.

The magnitude of the impedance at a point in a circuit may be obtained by applying a signal to the circuit at that point and measuring the ratio of the voltage and current. In addition, the phase angle of the impedance may be determined by measuring the phase of the current with respect to the applied voltage. Accordingly, the impedance can be determined by examining voltage-current relationships at one point in a circuit. In the present invention, the necessary measurements are made conveniently at a point on a transmission line extending from the signal source to the load circuit, the impedance of which is to be measured, and preferably are made at a point near the load circuit in order to simplify or eliminate subsequent calculations.

In order to obtain the desired data, two signals are derived from this main transmission line, preferably at the same point, the point of reference; one of these signals is a function of the magnitude of the voltage on the main transmission line at the reference point, and the other is a function of the magnitude of the current at the point of reference. The absolute values of these two signals are difficult to measure but their ratio can be determined by measuring the amount by which one of the signals must be attenuated in order to be equal in value to the other. This determination establishes the magnitude of the impedance.

It is convenient to utilize the two signals after they have been equalized in value to determine the phase angle of the impedance. If the attenuation is accomplished without changing the relative phase of the signals, the derived signals can be made to have the same phase difference as the current and voltage on the main transmission line. Thus, by transmitting the signals along reflectionless transmission lines, points may be found on these lines where the phase of the two voltages is opposite. The difference in the distances travelled by the signals from the main transmission line along the auxiliary lines to these points will then provide a basis for determining the phase angle of the impedance, provided the frequency of the signal is known.

Figure 1:
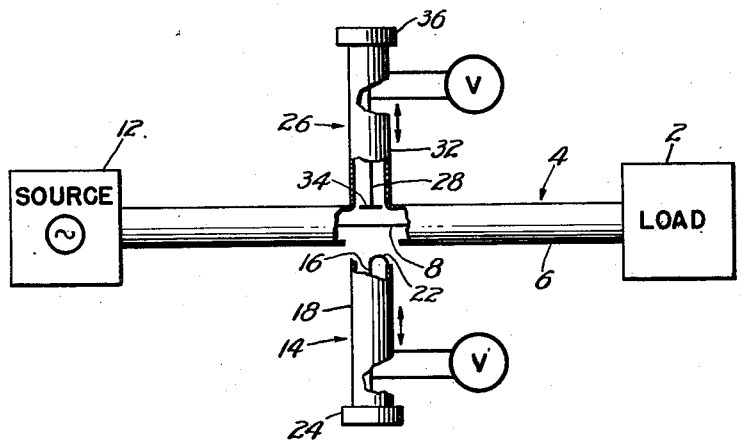
Fig. 1 is a diagrammatic view of an electrical system for the purpose of illustrating certain principles of the invention.

The diagrammatic arrangement of Fig. 1 will serve to illustrate further certain of the principles of the present invention. A load 2, which represents the electrical circuit or element, the impedance of which is to be measured, is connected to a main transmission line, for example, a coaxial line, generally indicated at 4, having an outer conductor 6 and an inner conductor 8. The opposite end of this line is connected to a signal generator 12, which provides a signal of the frequency at which the impedance measurement is to be made. At one point, the point of reference, along the line 4, an auxiliary coaxial line, generally indicated at 14, and having an inner conductor 16 and an outer conductor 18, is coupled to the coaxial line 4. In order that the signal on line 14 will be a function of the current on the main line 4 at the point of reference, this is accomplished by magnetic coupling, for example, by a small loop 22 arranged to couple inductively to the line 4.

In order that no standing waves will appear on the auxiliary line 14 at the frequency of operation, it is terminated by an element 24 having the proper impedance characteristics, for example, a resistor equal in value to the characteristic impedance of line 14.

A second auxiliary line, generally indicated at 26, having an inner conductor 28 and an outer conductor 32, is coupled to the coaxial transmission line 4, conveniently at a point adjacent line 14. In order that the signal on line 26 will be a function of the voltage on the main line 4 at the point of reference, this coupling is accomplished by electrostatic means, for example, a small disc-like probe 34 arranged to couple capacitively to line 4. The line 26 is terminated by an impedance element 36, similar to impedance element 24, and which, conveniently, is a resistor equal in value to the characteristic impedance of line 26.

Thus, two auxiliary lines are coupled loosely to the main transmission line at a point between the signal generator and the load; one of the lines being magnetically coupled and the other electrostatically coupled.

Figure 2:
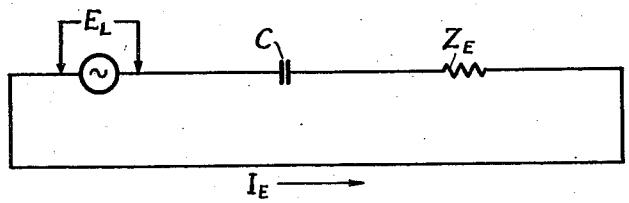
Figs. 2 and 3 are electrical circuits for explaining the principles of operation of one embodiment of the invention.

The current that will flow in the auxiliary line 26 can be determined by considering the equivalent circuit shown in Figure 2, wherein the voltage $E_L$ is the radio frequency voltage on line 4 at the point of reference, C represents the capacity coupling between probe 34 and line 4, and $Z_E$ represents the characteristic impedance, or terminating resistance 36, of the auxiliary line 26. Thus, the current in line 26 is $$I_E = \frac{E_L}{Z_E - \frac{j}{\omega C}} \qquad (1)$$

then by multiplying both numerator and denominator by $j\omega C$ $$I_E = \frac{j\omega C E_L}{1 + j\omega C Z_E} \qquad (2)$$

If the capacitive reactance of the electrostatic probe 34 is very large in comparison with the characteristic impedance of the lines, then the current in line 26, caused by the voltage on line 4, may be written:

$$I_E = j\omega C E_L \qquad (3)$$

Figure 3:
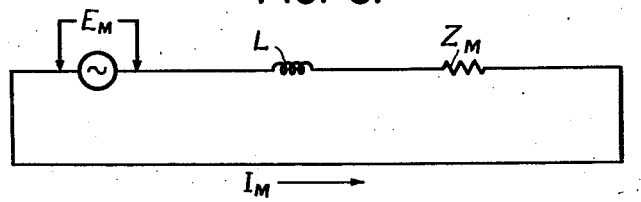

The magnetically induced current in line 14, caused by the current in line 4, can be calculated by considering the equivalent circuit shown in Figure 3, where $E_M$ represents the voltage induced in the magnetic coupling loop 22, L represents the inductance of the loop 22, and $Z_M$ represents the characteristic impedance of line 14, which is equal to the resistance value of the termination 24. Thus, the current on line 14, is $$I_M = \frac{j\omega M I_L}{Z_M + j\omega L} \qquad (4)$$

where M is the mutual inductance between the loop 22 and the line 4, and $I_L$ is the radio frequency current in line 4 at the point of reference.

If the inductive reactance of the magnetic probe is very small in comparison with the characteristic impedance; Equation 4 may be expressed as follows:

$$I_M = \frac{j\omega M I_L}{Z_M} \qquad (5)$$

Under these conditions, that is, when the inductive reactance of the magnetic probe is very small in comparison with the characteristic impedance of line 14, and when the capacitive reactance of the electric probe 34 is very large in comparison to the characteristic impedance of line 26, the difference in phase between the current induced in auxiliary lines 14 and 26 is the same as the difference in phase between the line voltage and the line current.

Solving Equations 3 and 5 for voltage and current, respectively, in line 4, and dividing the voltage by the current:

$$E_L = \frac{I_E}{j\omega C} \qquad (6)$$

$$I_L = \frac{I_M Z_M}{j\omega M} \qquad (7)$$

$$\frac{E_L}{I_L} = \frac{I_E}{I_M} \cdot \frac{M}{Z_M C} \qquad (8)$$

It is apparent that the relative magnitudes of the currents in the auxiliary lines 14 and 26 depend upon the impedance at the point of reference on the main line and upon the mutual coupling between loop 22 and the line 4, upon the capacitance of probe 34, and upon the characteristic line impedance. Thus, by determining the relative phase and magnitudes of the currents in the auxiliary lines, and by establishing a calibration for the constant parameters of Equation 8, the impedance of the line 4 at the reference point would be known.

Figure 4:
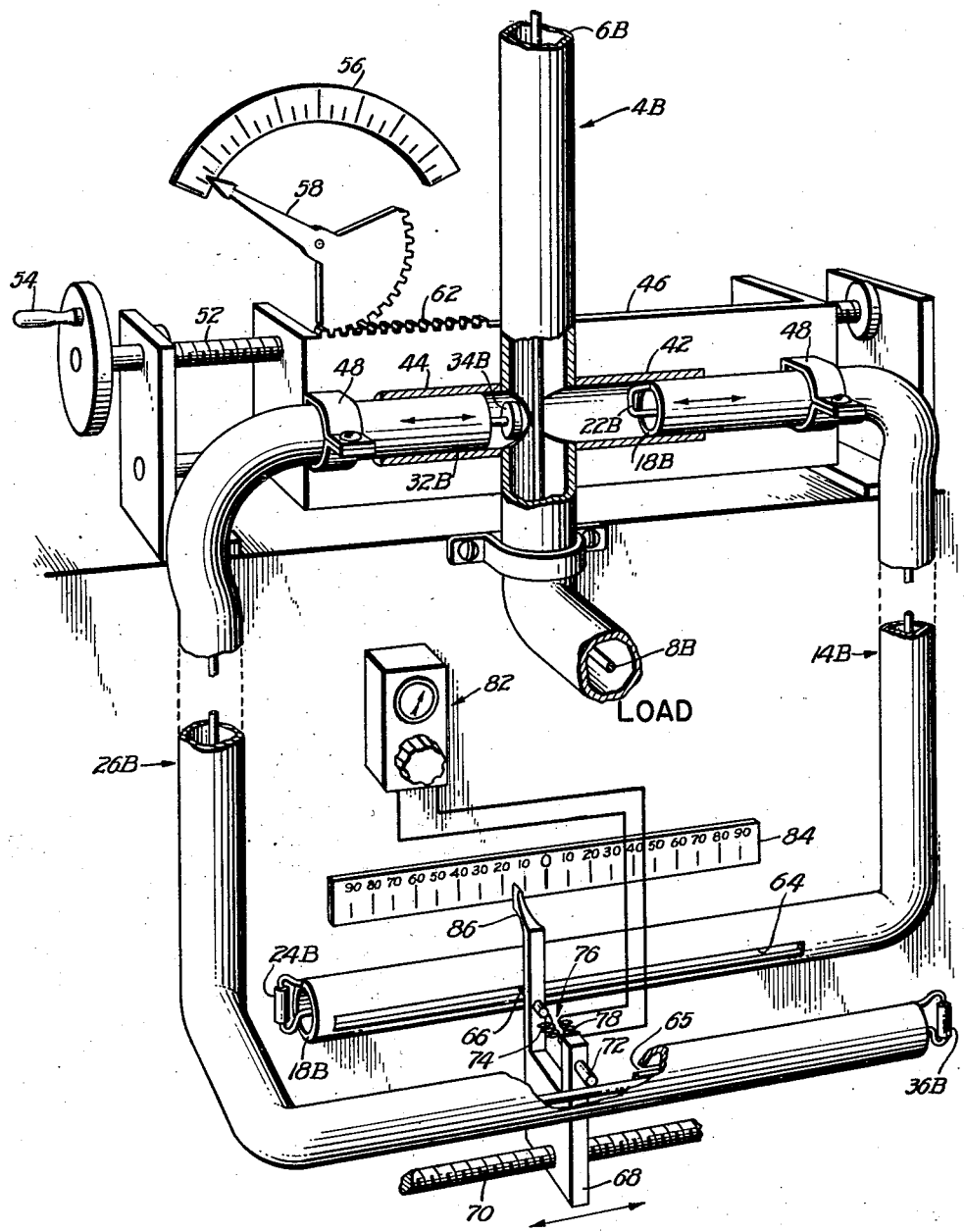
Fig. 4 shows diagrammatically an impedance measuring system illustrating the operation of a preferred embodiment of the invention.
Figure 5:
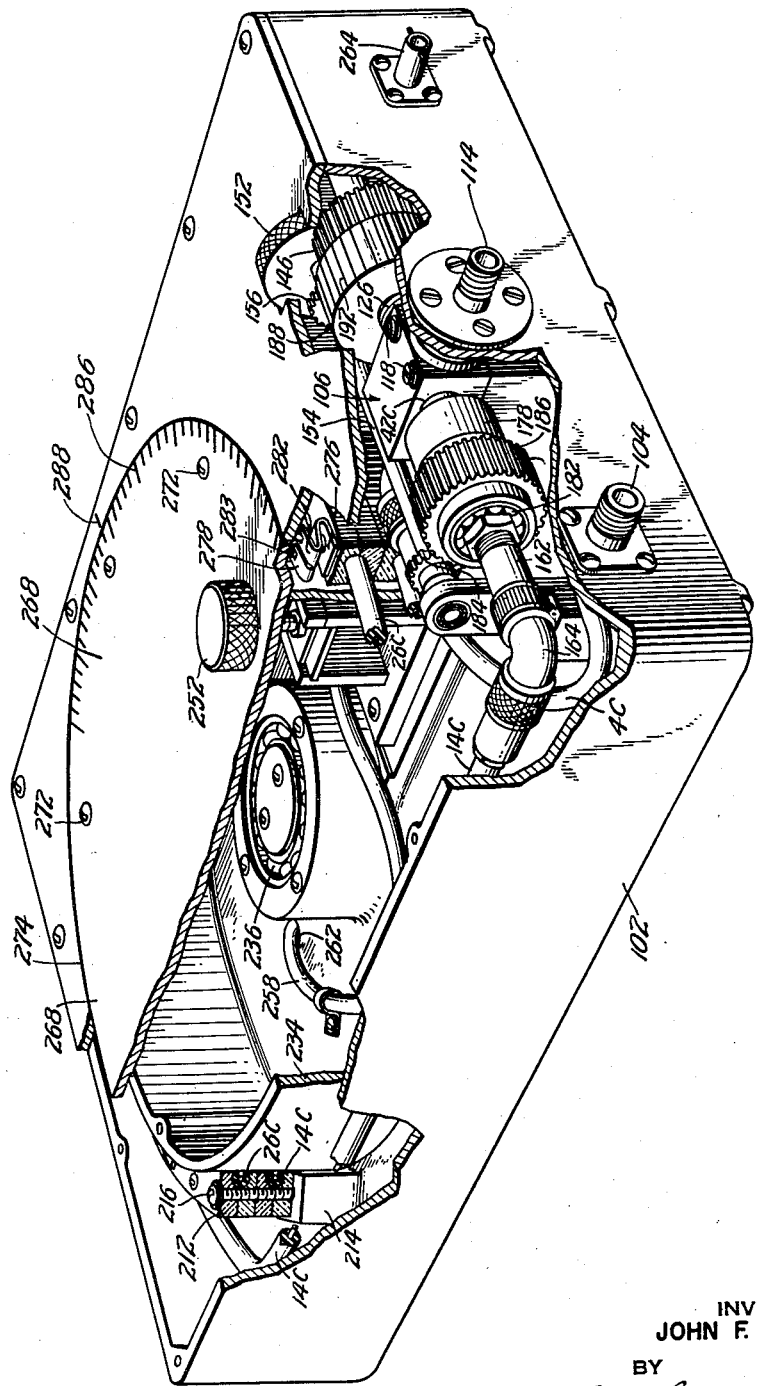
Fig. 5 is a perspective view, with suitable portions cut away, illustrating the construction of a laboratory impedance measuring apparatus embodying the invention.
Figure 6:
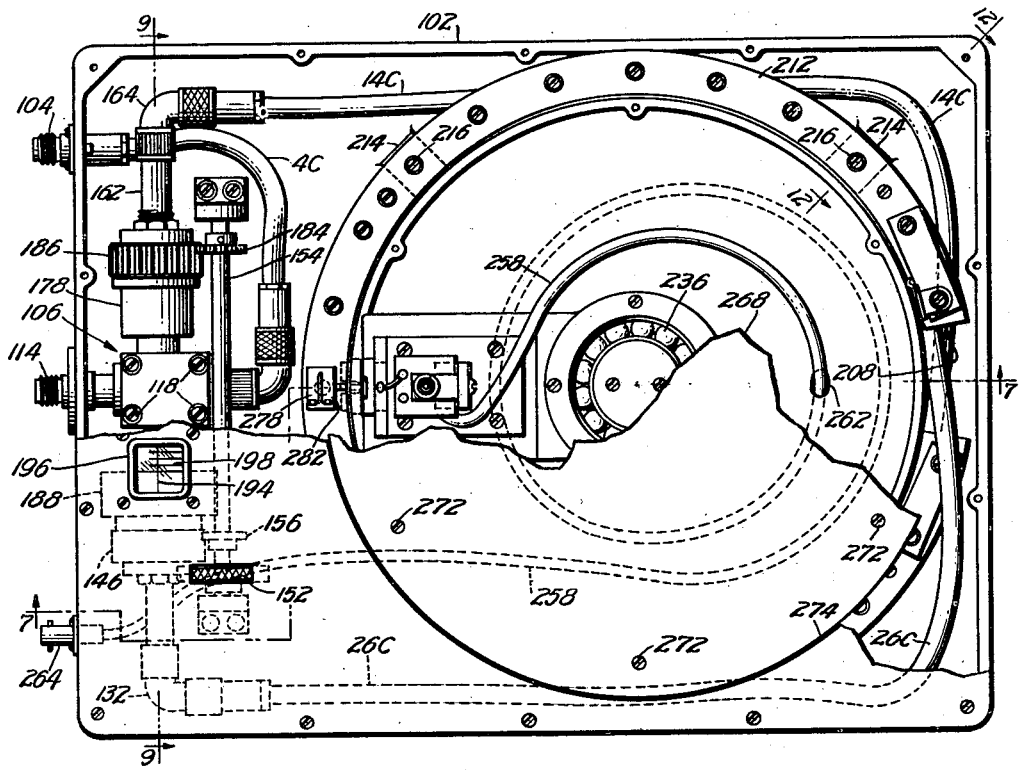
Fig. 6 is a plan view, with portions cut away, of the impedance measuring apparatus shown in Fig. 5.

Fig. 4 illustrates, diagrammatically, apparatus for making such determinations. In this arrangement, a coaxial line 4B extends between the signal generator (not shown) and the load (not shown), the impedance of which is to be measured. A loop 22B is utilized to induce a current, proportional to the current in line 4B at the reference point, in a transmission line 14B which is terminated by a resistor 24B, the value of which is equal to the characteristic impedance of line 14B.

A capacity probe 34B induces a current, proportional to the voltage in line 4B at the point of reference, in a coaxial line 26B which is terminated by a resistor 36B, the value of which is equal to the characteristic impedance of line 26B.

As pointed out above, it is not necessary to determine the actual magnitudes of the currents in the transmission lines 14B and 26B, but only to ascertain the ratio of the magnitudes of these currents. This is accomplished in the present embodiment by attenuating one or both of the currents so that the two currents are equal in magnitude, and measuring the relative attenuation of the signals necessary to bring about this condition. This can be accomplished, for example, by the use of piston type attenuators. Thus, a rigid tubular conductor or sleeve 42 is joined to the outer conductor 6B of transmission line 4B at the point of reference. The outer conductor 18B of line 14B is arranged to slide longitudinally within sleeve 42. Thus, the magnitude of the current induced in line 14B will vary in accordance with the position of transmission line 14B within the sleeve 42.

A similar attenuator is shown in conjunction with the capacity probe 34B and comprises an outer tubular conductor or sleeve 44, within which the outer conductor 32B of line 26B is arranged to slide. The lines 14B and 26B are each secured to a carriage 46, as by brackets 48.

In order to move the piston attenuators, the carriage 46 is slidably mounted and arranged to be driven laterally in either direction by means of a screw 52, operated by a hand crank 54, while the main transmission line 4B, together with sleeves 42 and 44, is anchored to a suitable stationary support. Thus, as crank 54 is turned so as to move the carriage 46 from right to left, as seen in Figure 4, the coupling between loop 22B and the line 4B will be increased as the loop 22 approaches the inner conductor 8B of line 4B, whereas the coupling between probe 34B and the line 4B will be decreased simultaneously as the capacity probe 34B recedes from conductor 8B.

Because the laws of attenuation of such simple piston attenuators are known, or can be measured, a calibration can be provided for indicating the magnitude of the ratio of voltage and current on line 4B at the point of reference. Thus, if the position of carriage 46 is adjusted in each instance so that the currents on lines 14B and 26B are equal, a scale 56, which cooperates with a pointer 58, driven by a rack 62 on carriage 46, can be calibrated directly in terms of the magnitude of the impedance of line 4B at the point of reference.

In order to determine when the equality of current between the lines 14B and 26B has been obtained, and at the same time determine the relative difference in phase between these currents and, thus, the phase angle of the impedance of line 4B, a rigidly supported portion of the line 14B is provided with a slot 64 extending through the outer conductor 18B into the interior of the cable. A similar, but oppositely disposed, slot 65 is provided in the outer conductor 32B of a parallel rigidly supported portion of the line 26B. A small probe 66 is supported by an insulating yoke 68 and extends through slot 64 into coaxial line 14B and is arranged to be moved longitudinally along the slot by rotation of a screw 70. A similar probe 72 extends through the oppositely disposed slot 65 in line 26B and is ganged with probe 66 by means of the insulating yoke 68.

A primary winding 74 of a transformer, generally indicated at 76, extends between the two probes and is coupled to a secondary winding 78, which is connected to a null-indicating device, generally indicated at 82.

Lines 14B and 26B are relatively free from standing waves, because these lines are properly terminated, however, the phase of the currents in each of these lines shifts along the length of the line, so that the phase of the voltages induced in the pick-up probes 66 and 72 will depend upon their respective positions along the slotted portions of these lines. It is apparent that, as insulating yoke 68 is moved to the right or left along the slotted portions of lines 14B and 26B, the distance between the point of reference and the yoke 68 along one of these lines will be increasing, while the distance along the other line will be decreasing simultaneously and, accordingly, a point can be located where the two signals are exactly 180 degrees out of phase. At this point, if the carriage 46 has been adjusted so that the currents in the lines 14B and 26B are equal in magnitude, no signal will be induced in the secondary winding 78 of transformer 76, and the null-indicating device 82 will denote this condition. Such a balance may be obtained readily by alternately adjusting the position of carriage 46 and the position of insulating yoke 68, to continually approach the null position by observing the indicator 82. Thus, when the null condition is obtained, the magnitude of the impedance on line 4B at the point of reference can be obtained directly from scale 56, and the phase angle of the impedance can be obtained from a calibrated scale 84, which cooperates with a pointer 86 extending from the yoke 68.

It is apparent that the calibrations in scale 84 will be dependent upon frequency. However, this is no serious matter because the scale can be calibrated at a frequency near the lower end of the range of operation of the apparatus and a scale-multiplying factor used in accordance with the actual frequency of operation.

Figs. 5 through 12 provide a more detailed understanding of the construction of a practical laboratory impedance measuring unit embodying the present invention. For convenience in using the equipment and so that the impedance measuring portion of the system can be utilized with the greatest flexibility, the signal generator and null indicator are arranged to be connected together by flexible coaxial conductors. To this end, the impedance measuring portion of the system (Fig. 5) is constructed as a separate unit in a cast aluminum case 102, and a conventional type coaxial connector 104 is provided on the front of the case so that a suitable signal generator can be connected readily to the unit.

This connector forms part of the main transmission line 4C (Fig. 6) and is connected by a short length of cable to a block, generally indicated at 106, which comprises a section of the main transmission line and provides the structural rigidity for the coupling arrangement associated with the auxiliary lines 14C and 26C.

In order that the distance between the point of reference, which is within the block 106, and the load circuit may be short, electrically, this block 106 is placed near the front panel of the case 102, where the main transmission line, as it emerges from block 106, is connected to a conventional coaxial connector 114, to which the load circuit is to be connected.

The block 106 has a hole extending through it from the rear to the front (Figs. 9 and 10), which forms a portion of the outer conductor of transmission line 4C, and is secured by screws 118 to a pedestal 120 extending upwardly from the bottom of case 102.

For additional rigidity and convenience in coupling, the dimensions of the inner and outer conductors of the main transmission line are increased near the point of reference. Thus, the center conductor is formed, within block 106, by a short section of rod 122, which is tapered as at 124, to the dimensions required by the connector 114.

In order to couple electrostatically the auxiliary line 26C to the main line 4C, a transverse opening is provided in block 106 into which is fitted a metal sleeve 44C, having a smooth interior surface and a threaded portion 126 on the exterior. To provide adjustable attenuation of the signal, a capacity coupling disc 34C, is supported by an internal sleeve 128, which is positioned slidably within the sleeve 44C and is connected by means of an elbow connector 132 to the outer conductor of auxiliary transmission line 26C.

The center conductor 134 of auxiliary transmission line 26C extends from the connector 132 axially through the sleeve 128 and is supported therein by insulating material 136. Conductor 134 extends beyond the inner end of sleeve 128 (Fig. 11), where its diameter is increased, as at 138, and supports at its end the capacity coupling disc 34C. Thus, the amount of coupling varies as sleeve 128, carrying with it probe 34C and the elbow connector 132, is moved longitudinally within sleeve 44C.

The mechanism for making this attenuation adjustment is constructed as follows. The outer race of a thrust bearing 142 (Fig. 10), which surrounds and is supported by the sleeve 128, is secured within a collar 144, which is provided at one end with external gear teeth 146 (Fig. 8), and at the opposite end with internal threads 148 (Fig. 10), which engage the external threads 126 on sleeve 44C. With this arrangement, rotation of collar 144 causes it to advance laterally along the threads 126 and carry with it, through the bearing 142, the transmission line, formed by the conductor 134 and the sleeve 128, which supports the coupling disc 34C.

In order to rotate the collar 144, a knurled hand wheel 152 is pinned to a rotatably supported shaft 154, to which is secured also a drive gear 156, the teeth of which engage the gear teeth 146 of collar 144; these teeth being of sufficient width along the collar 144 that drive gear 156 remains engaged therewith irrespective of the lateral adjustment of collar 144. Thus, adjustment of wheel 152, which projects through the top cover of case 102 (Fig. 5), causes gear 156 to rotate collar 144 advancing it along the threads 126 and moving with it the capacity probe 34C.

In a similar manner, the magnetically coupled auxiliary transmission line 14C is arranged to couple to the main transmission line 4C. A sleeve 42C is secured, for example, by press-fitting, into a suitable transverse opening in block 106 opposite the sleeve 44C, and is provided with an externally threaded portion 158. A sleeve 162, arranged to slide longitudinally within the sleeve 42C in order to vary the amount of coupling, is connected, by means of an elbow connector 164, to the outer conductor of auxiliary transmission line 14C, the inner conductor 166 of which extends coaxially through the sleeve 162 and is connected through a resistor 168 (Fig. 11) to a coupling loop, generally indicated at 22C.

This coupling loop is shielded electrostatically in order to prevent capacitive coupling between the loop and the main transmission line 4C. A lead 172 is connected to resistor 168 and extends through a curved sleeve 174 of conductive material, from which it is insulated, and is connected electrically to the end of a similar juxtaposed sleeve 176. The sleeves 174 and 176 are connected to the end of and are supported by the internal sleeve 162; the adjacent ends of these sleeves being spaced to permit the desired magnetic coupling.

The driving mechanism for controlling the attenuation of the magnetically induced signal is similar to that described in connection with the capacitive pick-up 34C, and comprises a collar 178 (Fig. 10) which is in threaded engagement with the external threads 158 of the sleeve 42C and which is fitted at the opposite end to the outer race of a thrust bearing 182, the inner race of which is secured to sleeve 162. A second driving gear 184 is secured to shaft 154 and is engaged with gear teeth 186 (Fig. 8) formed on the exterior of collar 178. With this arrangement, rotation of knob 152 in a given direction increases the coupling of one of the auxiliary transmission lines and simultaneously decreases the coupling of the other transmission line.

In order that the attenuation in both lines will change by the same amount with a given lateral movement of the attenuators, it is desirable to provide some means for compensating the natural difference in the rate of attenuation between the piston type capacitive and magnetic attenuators. In this embodiment, as shown in Fig. 10, the internal diameter of sleeve 44C is larger than the internal diameter of sleeve 42C. These diameters are proportioned, in accordance with known laws of attenuation, so that the change in attenuation per unit of axial movement of the pick-up probe is the same in the two attenuators.

The position to which the ganged attenuators must be adjusted, in order to produce currents of equal magnitudes in the auxiliary transmission lines 14C and 26C, depends upon the ratio of voltage and current at the point of reference on the main line 4C. Thus, assuming that means will be provided for indicating when this condition of equality has been established, the lateral position of the attenuators may be calibrated in terms of the magnitude of the impedance at the point of reference. This is accomplished conveniently by an annular flange 188 (Figs. 8 and 10) which is secured to collar 144. The outer surface of flange 188 is provided with suitable vernier scale marks 192 (Fig. 8) which cooperate with an index mark 194 (Fig. 6) inscribed on a transparent window 196 in the cover of the case 102. Additional scale marks 198 on the transparent window 196 serve as an indication of the lateral position of flange 188. Thus, the marks 198 provide the coarse scale divisions while the marks 192, cooperating with index mark 194, provide for more exact calibration. Conveniently, these scales are calibrated so that the magnitude of the impedance on the main transmission line at the point of reference can be read directly from them.

In order that the slotted portions of auxiliary transmission lines 26C and 14C can be traversed conveniently by pick-up probes 66C and 72C (Fig. 7), the slotted portions are supported rigidly along a circular path. A flexible portion of the transmission line 26C (Fig. 6) extends from elbow connector 132 toward the rear of case 102 where it joins the slotted section at point 208. From this point the outer conductor of transmission line 26C is formed by a block 212 of metal (see also Fig. 12) extending along the arc of a circle and which is secured at suitable intervals to upwardly extending bosses 214, as by screws 216. The inner surface of block 212 is provided with a slot 65C which coincides with a longitudinal slot in the insulation surrounding the center conductor of line 26C. The arcuate block 212 of line 26C extends around most of the circumference of the circular path; the line being terminated at its end by a non-inductive resistance element (not shown) having a value substantially equal to the characteristic impedance of line 26C which, for example, may be of the order of 50 ohms.

The auxiliary transmission line 14C extends from elbow connector 164 (Fig. 6) toward the rear of case 102 at which point it becomes a slotted line and follows along a circular path adjacent the line 26C, but in the opposite direction. As shown in Fig. 12, the arcuate block 212 forms also the outer conductor of the slotted portion of line 14C; a slot 64C similar to slot 65C, being provided for line 14C. Line 14C after extending around the greater portion of the circumference of the circle is terminated by a resistance element (not shown) similar to that of line 26C.

Figure 7:
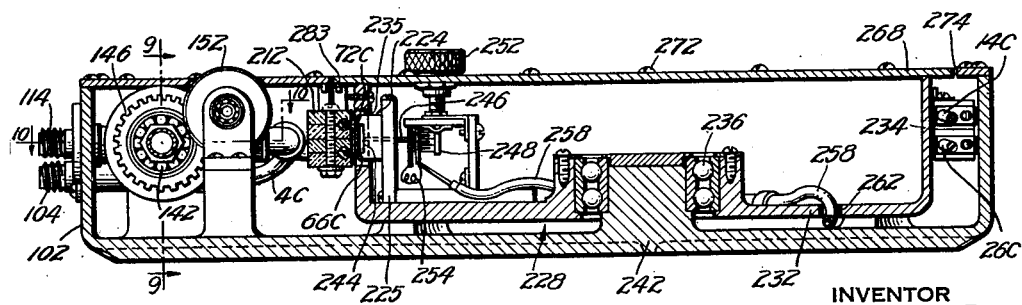
Fig. 7 is a section taken along line 7—7 of Fig. 6.

The probes 66C and 72C (Fig. 7) are mounted on an insulating support 224 and extend into the slotted portions of the lines 14C and 26C, respectively. The support 224 extends outwardly from an upright member 226 (see also Fig. 5) that is supported on a rotatably mounted turntable 228 (Fig. 7). Turntable 228 is provided with a circularly-shaped bottom portion 232 and upwardly extending sides or flanges 234 in which a suitable opening 235 is provided so that the probes 66C and 72C can extend outwardly into the slotted portions of the auxiliary transmission lines.

In order that the turntable 228 can be rotated and yet be sufficiently sturdy that the coupling between the probes 66C and 72C and their respective slotted line portions does not change because of eccentric motion of turntable 228, a relatively large diameter ball bearing 236 is provided at the center of turntable 228; the inner race thereof being secured to a projection 242 preferably formed integrally with and extending upwardly from the bottom of case 102.

Thus, as the turntable 228 is rotated, the probes 66C and 72C traverse their respective portions of the slotted lines, with one of the probes electrically approaching the point of reference on the main transmission line, while the other probe electrically recedes from that point.

The two probes 66C and 72C are joined together by a vertically extending conductor 244, which at its midpoint is connected to a horizontal lead 246, which will carry no signal from the probes, if, at the particular point where the probes are positioned in the slotted lines, the voltages induced in the probes 66C and 72C are exactly equal in magnitude and exactly 180 degrees out of phase. At other points along these lines a signal representing the difference between the two voltages induced in the pick-up probes 66C and 72C will be carried by lead 246.

This lead 246 may be coupled directly to the null indicator (not shown), but in order to reduce the pick-up of spurious or stray signals it may be coupled through a series resonant circuit comprising a small variable condenser 248, the capacity of which may be adjusted by means of a control knob 252 on the upper surface of the case 102, and a coil 254; the values being such that the circuit can be adjusted to resonance at any frequency throughout the operating range of the instrument.

This resonant circuit is connected to the inner conductor of a flexible coaxial transmission line 258 which passes through an opening 262 (Fig. 6) in the bottom plate 232 of turntable 228 and extends in one or more loose spirals around the projection 242 beneath turntable 228 and is connected to a coaxial connector 264 on the front of case 102. The loose spirals in the cable 258 are provided to permit the necessary freedom for rotation of turntable 228. The connector 264 can be connected by conventional coaxial cable, to a suitable null-detector, for example, a radio receiver.

The upper surface of turntable 228 is provided with an overlapping cover 268 (Fig. 7) secured to the side walls 234 by screws 272; a suitable annular slot 274 remaining between the edges of cover plate 268 and the case 102.

With this arrangement, the pick-up circuit is well shielded within the turntable 228 so that spurious signals are not transmitted to the null indicator. In order to further reduce stray pickup, suitable ground connections are provided where required. For example, several spring contacts 276 (Figs. 5 and 7), secured to the upper surface of block 212 at suitable intervals, are provided for grounding the cover 268 to the case 102. The contacts 276 are formed of two adjacent upwardly extending fingers 278 and 282; one of the fingers 278 making contact with the outer edge of turntable cover 268, as through a metallic roller 283, and the other finger 282 making contact with the case 102.

The position of the probes 66C and 72C along their respective transmission lines is adjusted by rotating the turntable 228 by manually rotating the turntable cover 268. Thus, alternate adjustment of wheel 152 and turntable cover 268 will produce the desired null or balance condition. The position of the cover plate 268 will then indicate the phase angle of the impedance of the load being measured. Advantageously, scale marks 286 are provided on the cover plate 268 and cooperate with an index mark 288 on case 102. These scale marks may be calibrated for a given frequency, for example, 100 megacycles, so that a proportionality factor may be readily established for use at other frequencies. Thus, if such a bridge were used at a frequency of 253 megacycles it would be necessary only to multiply the readings obtained from scale 286 by a factor of 2.53 to obtain directly the impedance angle of the load circuit. It is also apparent that by means of simple open and short-circuit tests, substituted for the load, that the positive and negative 90 degree marks on the calibrated scales can be checked readily for accuracy.

The null indicator may be any device that will indicate the relative magnitude of a signal at the frequency of operation, and, for example, may be a conventional radio receiver having an output meter for indicating the signal strength, or the signal applied to the main transmission line may be modulated with an audio voltage so that the null condition may be observed by listening for an audible signal from the loud speaker of the radio receiver.

It is apparent that the usual precautions in designing null balancing equipment must be observed and stray pick-up which would interfere with obtaining an accurate null must be substantially eliminated. The particular construction of the impedance measuring unit described above is such as to inherently minimize stray pick-up voltages within the impedance measuring apparatus.

Mathematical analysis of the bridge has shown that the restrictive conditions set forth at the beginning of the description, that is, that the inductive reactance of the magnetic probe is small in comparison with the characteristic impedance of the cable, and that the capacity reactance of the electrostatic probe is large in comparison with the characteristic impedance of the cable, is eliminated if the apparatus is designed so that the inductance of the magnetic probe is equal to the capacitance of the electrostatic probe multiplied by the square of the characteristic impedance of the cable. As a practical matter, this condition can be realized because the capacitance of the electrostatic probe, although varying slightly with changes in position of the attenuator, is largely determined by the capacity between the disc 34C and the inner surface of the coaxial sleeve 44C; the capacity of this disc to the center conductor of the main transmission line 4C, the variable component, being quite small by comparison.

It is possible to terminate the auxiliary transmission lines 14C and 26C by resistance elements so that the standing wave ratios on the lines are quite small, but seldom, if ever, can the ratio be reduced to unity. However, in a system such as that described, the standing wave ratio can readily be made sufficiently small that the accuracy of the bridge is adequate for most purposes. It is also apparent that the types of mismatch caused by the termination of the auxiliary lines 14C and 26C, can be made identical by terminating the lines with identical elements. The amount of error caused by the improper termination varies with the characteristics of the load to be measured and with the frequency at which the measurements are made. Although this error would not be present if reflections on the lines 14C and 26C were eliminated, the error exists principally because the electrostatic probe acts somewhat like a constant current generator and the magnetic probe acts somewhat as a constant voltage generator. If the terminating resistances of the lines 14C and 26C differ by two percent from the characteristic impedance of the lines, errors in the readings as high as four percent could be expected, which for many purposes would be sufficient accuracy. However, by inserting a resistance element 168, having a value, for example, of about 50 ohms, in series with the magnetic probe 22C (Fig. 11) and placing a similar resistor 28A in parallel with the electrostatic probe 34C, the errors caused by slight mismatch at the termination of the auxiliary transmission lines 14C and 26C are substantially eliminated.

The probes 66C and 72C which extend into the slotted portions of lines 26C and 14C, respectively, have been found to produce an error that is not serious, and is much less important than the discontinuity introduced by the probe in an ordinary slotted line measuring apparatus, because the slotted lines in the present system are well terminated at all times, which is seldom true with ordinary slotted line measuring systems. It is advantageous, of course, to construct the slotted lines and the probes with reasonable precision in order to reduce any errors to a minimum value.

From the foregoing, it will be observed that the impedance measuring apparatus described above and which embodies the present invention is well adapted to attain the ends and objects hereinbefore set forth, and to be economically manufactured; the separate features being well suited to common production methods and readily susceptible to a variety of modifications as may be desirable in adapting the invention to various applications or production techniques. It is to be understood that this example is not intended to be exhaustive or limiting of the invention, but is given for purposes of illustration in order that others with suitable knowledge in this art can fully understand the invention and the principles thereof and the manner of applying it in practical use so that they can modify and adapt it in various forms, each as may be suited best to the conditions of a particular use.

I claim:

1. The method of measuring the high frequency impedance at a point of reference comprising the steps of applying an alternating signal to that point, magnetically coupling a first auxiliary transmission line to said signal substantially at said point of reference, electrostatically coupling a second auxiliary transmission line to said signal substantially at said point of reference, equalizing the magnitudes of the signals induced by said coupling into said auxiliary transmission lines, locating respective positions on said auxiliary transmission lines at which said induced signals are opposed in phase, and measuring the relative distances along the respective auxiliary transmission lines between said point of reference and said positions.

2. The method of measuring impedance at a point of reference on a main transmission line carrying a radio frequency signal comprising the steps of magnetically coupling a first substantially reflectionless transmission line to said main transmission line substantially at said point of reference, electrostatically coupling a second reflectionless transmission line to said main transmission line substantially at said point of reference, equalizing the magnitudes of signals induced by said coupling into said auxiliary transmission lines, measuring the relative change in the magnitudes of said signals necessary to produce the said equalization to determine the magnitude of the impedance at said point of reference, inducing first and second voltages from said first and second reflectionless lines respectively, comparing said first and second voltages, adjusting the positions along said lines at which said first and second voltages are induced to obtain a predetermined relationship therebetween, and evaluating the relative distances along the respective reflectionless lines between said positions and said point of reference to determine the phase angle of said impedance.

3. The method of measuring the impedance at a point of reference on a main transmission line carrying a radio frequency signal comprising the steps of magnetically coupling to said main transmission line substantially at said point of reference a first coaxial auxiliary transmission having a slotted portion and terminated by a resistance equal to the characteristic impedance of said auxiliary line, electrostatically coupling a second similar auxiliary transmission line to said main transmission line substantially at said point of reference, determining the magnitude of said impedance by attentuating the magnitudes of the signals induced into said auxiliary transmission lines by such amounts that these signals are of equal magnitude, and measuring the comparative attenuation of said induced signals, locating respective points on said auxiliary transmission lines at which said induced signals are opposed in phase, and determining the phase angle of said impedance by inserting first and second movable pick-up probes through said slotted portions of said first and second auxiliary lines respectively, comparing the signals from said pick-up probes, adjusting the positions of said probes to obtain a null indication, and measuring the relative distances between said point of reference and said pick-up probes along the respective auxiliary transmission lines.

4. The method of determining the magnitude of an impedance at a point of reference in a high frequency circuit comprising the steps of applying a high frequency signal to said point, generating a first signal substantially proportional to the magnitude of the high frequency current at said point of reference, generating a second signal substantially proportional to the magnitude of the high frequency voltage at said point of reference, attenuating said first and second signals to equalize the magnitudes thereof, and measuring the relative attenuations producing these equal magnitudes to obtain thereby the magnitude of said impedance.

5. In a system for measuring impedance at high frequencies, the combination comprising a main transmission line having one end connectible to an alternating current source corresponding in frequency to that at which the impedance is to be measured and a second end connectible to a load circuit the impedance of which is to be measured, first and second auxiliary transmission lines magnetically and electrostatically coupled respectively to said main transmission line and each being terminated so as to eliminate substantially standing waves therefrom, and an attenuator associated with at least one of said auxiliary transmission lines and adjustable to vary the magnitude of the current flowing therein, first and second pick-up means coupled respectively to said first and second auxiliary transmission lines, means for varying the distance along at least one of said auxiliary transmission lines between said main transmission line and the pick-up means associated therewith, and means indicating when the voltages induced by said pick-up means bear predetermined magnitude and phase relationships.

6. In a system for measuring impedance at high frequencies, the apparatus comprising a main transmission line having one end connectible to an alternating current source corresponding in frequency to that at which the impedance is to be measured and a second end connectible to a load circuit the impedance of which is to be measured, first and second auxiliary coaxial transmission lines magnetically and electrostatically coupled respectively to said main transmission line and each being terminated so as to eliminate substantially standing waves from these auxiliary lines, and attenuator associated with each of said auxiliary transmission lines and adjustable to vary the magnitude of the currents flowing therein, first and second pick-up means coupled respectively to said first and second auxiliary transmission lines, means for varying the distances along said auxiliary transmission lines between said main transmission line and the pick-up means associated therewith, and means for indicating when the voltages induced by said pick-up means are equal in magnitude and bear predetermined phase relationships.

7. In a system for measuring impedance at high frequencies, the apparatus comprising a main transmission line having one end connectible to an alternating current source corresponding in frequency to that at which the impedance is to be measured and a second end connectible to a load circuit the impedance of which is to be measured, first and second auxiliary transmission lines magnetically and electrostatically coupled respectively to said main transmission line and each being terminated by a resistance substantially equal to the characteristic impedance of said lines to eliminate substantially standing waves therefrom, first and second attenuators associated respectively with said first and second auxiliary transmission lines and adjustable to vary the magnitude of the currents flowing therein, first and second pick-up means coupled respectively to said first and second auxiliary transmission lines, means for varying the distance along at least one of said auxiliary transmission lines between said main transmission line and the pick-up means associated therewith, and means for indicating when the voltages induced by said pick-up means have equal magnitudes and predetermined phase relationships.

8. In a system for measuring impedance at high frequencies, the apparatus comprising a source of high frequency signals, a load circuit the impedance of which is to be measured, a main transmission line extending between the said source and said load, first and second auxiliary transmission lines magnetically and electrostatically coupled respectively to said main transmission line, first and second attenuators connected respectively to said first and second auxiliary transmission lines, said auxiliary transmission lines each being terminated by a resistance element of value substantially equal to the characteristic impedance of the respective lines, first and second pick-up probes coupled to said first and second auxiliary transmission lines respectively and movable relative thereto, and a null indicator coupled to said probes for indicating when the signals induced in said probes bear a predetermined phase and magnitude relationship.

9. In a system for measuring impedance at high frequencies, the apparatus comprising a source of high frequency signals, a load circuit the impedance of which is to be measured, a main transmission line extending between said source and said load, first and second auxiliary coaxial transmission lines magnetically and electrostatically coupled respectively to said main transmission line, first and second attenuators connected respectively to said first and second auxiliary transmission lines, said auxiliary transmission lines each having a longitudinal slot through the outer conductor thereof and each being terminated by a resistance element of value substantially equal to the characteristic impedance of the respective lines, first and second pick-up probes extending into said slots in said first and second auxiliary transmission lines respectively and movable longitudinally therealong, and a null indicator coupled to said probes for indicating when the signals induced in said probes are equal in magnitude and opposite in phase.

10. In a system for measuring impedance at high frequencies, the apparatus comprising a source of high frequency signals, a load circuit the impedance of which is to be measured, a main transmission line extending between the said source and said load, first and second auxiliary coaxial transmission lines having magnetic and electrostatic probes coupled respectively to said main transmission line, first and second piston type attenuators associated respectively with said magnetic and electrostatic probes, said auxiliary transmission lines each having a longitudinal slot through the outer conductor thereof and each being terminated by a resistance element of value substantially equal to the characteristic impedance of the respective lines, first and second pick-up probes extending into said slots in said first and second auxiliary transmission lines respectively and ganged for simultaneous movement longitudinally therealong, and a null indicator coupled to said probes for indicating when the signals induced in said probes are equal in magnitude and opposite in phase.

11. In a system for measuring impedance at high frequencies, the apparatus comprising a source of high frequency signals, a load circuit the impedance of which is to be measured, a main transmission line extending between said source and said load, a first auxiliary transmission line having at one end a loop arranged to couple energy from said main transmission line to said first auxiliary line, a second auxiliary line having a capacity type probe arranged to couple energy from said main transmission line to said second auxiliary line, first and second attenuators connected respectively to said first and second auxiliary transmission lines, said auxiliary transmission lines each being terminated by a resistance element of value substantially equal to the characteristic impedance of the respective lines, first and second pick-up probes coupled to said first and second auxiliary transmission lines respectively and movable relatively thereto, and a null indicator coupled to said probes for indicating when the signals induced in said probes bear a predetermined phase and magnitude relationship.

12. In a system for measuring impedance at high frequencies, the apparatus comprising a source of high frequency signals, a load circuit the impedance of which is to be measured, a main transmission line extending between said source and said load, first and second auxiliary coaxial transmission lines magnetically and electrostatically coupled respectively to said main transmission line, first and second attenuators connected respectively to said first and second auxiliary transmission lines, said auxiliary transmission lines each having a longitudinal slot through the outer conductor thereof and each being terminated by a resistance element of value substantially equal to the characteristic impedance of the respective lines, said slotted portions of said auxiliary transmission lines being positioned adjacent each other and rigidly supported along an arcuate path, first and second pick-up probes extending into said slots in said first and second auxiliary transmission lines respectively and movable therealong, and a null indicator coupled to said probes for indicating when the signals induced in said probes are equal in magnitude and opposite in phase.

13. In a system for measuring impedance at high frequencies, the apparatus comprising a source of high frequency signals, a load circuit the impedance of which is to be measured, a main transmission line extending between said source and said load, a first auxiliary coaxial transmission line having at one end a coupling loop for magnetically coupling energy from said main transmission line, a second auxiliary transmission line having at one end a disc-like probe for electrostatically coupling energy from said main transmission line, first and second attenuators associated respectively with said first and second auxiliary transmission lines, manually operable ganged driving members coupled to said attenuators for simultaneously changing the attenuation produced thereby but in opposite directions, said auxiliary transmission lines each having a longitudinal slot through the outer conductor thereof and each being terminated by a resistance element of value substantially equal to the characteristic impedance of the respective lines, said slotted portions of said auxiliary transmission lines being positioned adjacent each other and rigidly supported along an arcuate path, first and second pick-up probes extending into said slots in said first and second auxiliary transmission lines respectively and movable therealong, and a null indicator coupled to said probes for indicating when the signals induced in said probes are equal in magnitude and opposite in phase.

14. In a system for measuring impedance at high frequencies, the apparatus comprising a source of high frequency signals, a load circuit the impedance of which is to be measured, a main transmission line extending between the said source and said load, first and second auxiliary coaxial transmission lines having respectively magnetic and electrostatic probes coupled to said main transmission line, said auxiliary transmission lines each having a longitudinal slot through the outer conductor thereof and each being terminated by a resistance element of value substantially equal to the characteristic impedance of the respective lines, first and second piston type attenuators associated respectively with said magnetic and electrostatic probes, ganged driving members for simultaneously changing the attenuation of said attenuators in opposite manners, a calibrated scale operated by said ganged members for denoting the impedance magnitude on said main line, first and second ganged pick-up probes extending into said slots in said first and second auxiliary transmission lines respectively and movable simultaneously therealong, a transformer having its primary winding coupled to said probes, and a null indicator coupled to the secondary of said transformer for denoting the absence of signal therein.

15. In a system for measuring impedance at high frequencies, a load circuit the impedance of which is to be measured, a main transmission line extending between the said source and said load, first and second auxiliary coaxial transmission lines having respectively magnetic and electrostatic probes coupled to said main transmission line, said auxiliary transmission lines each having a longitudinal slot through the outer conductor thereof and each being terminated by a resistance element of value substantially equal to the characteristic impedance of the respective lines, first and second piston type attenuators associated respectively with said magnetic and electrostatic probes, said magnetic attenuator having a smaller internal diameter than said electrostatic attenuator and being proportioned so that similar mechanical adjustment of the attenuators produces similar changes in attenuation, driving means coupled to said attenuators and arranged to increase the attenuation of one of said attenuators while simultaneously reducing by a like amount the attenuation of the other, first and second pick-up probes extending into said slots in said first and second auxiliary transmission lines respectively and movable longitudinally therealong, and a null indicator coupled to said probes for indicating when the signals induced in said probes are equal in magnitude and opposite in phase.

16. Apparatus for measuring impedance at high frequencies comprising a source of high frequency signals, a load circuit the impedance of which is to be measured, a main transmission line extending between the said source and said load, first and second auxiliary coaxial transmission lines having respectively magnetic and electrostatic probes coupled to said main transmission line, said auxiliary transmission lines each having a longitudinal slot through the outer conductor thereof and each being terminated by a resistance element of value substantially equal to the characteristic impedance of the respective lines, said magnetic probe having a fixed resistance element in series therewith, said electrostatic probe having a fixed resistance element in shunt therewith, first and second piston type attenuators associated respectively with said magnetic and electrostatic probes, ganged driving members for simultaneously changing the attenuation of said attenuators in opposite manners, a calibrated scale operatively associated with said ganged members for denoting the impedance magnitude on said main line, first and second ganged pick-up probes extending into said slots in said first and second auxiliary transmission lines respectively and movable simultaneously therealong, a transformer having its primary winding coupled to said probes, a null indicator coupled to the secondary of said transformer for denoting the absence of signal therein, and a calibrated scale associated with said ganged pick-up probes for denoting the phase angle of said impedance.

17. Apparatus for measuring impedance at high frequencies comprising a source of high frequency signals, a load circuit the impedance of which is to be measured, a main transmission line extending between the said source and said load, first and second auxiliary coaxial transmission lines having respectively magnetic and electrostatic probes coupled to said main transmission lines, said auxiliary transmission lines each having adjacent rigidly mounted arcuate portions with longitudinal slots through the outer conductors thereof and each being terminated by a resistance element of value substantially equal to the characteristic impedance of the respective lines, first and second piston type attenuators associated respectively with said magnetic and electrostatic probes, ganged driving members for simultaneously changing the attenuation of said attenuators in opposite manners, a calibrated scale operated by said ganged members for denoting the impedance magnitude on said main line, first and second auxiliary transmission lines respectively and movable simultaneously along said slots, a balancing circuit coupled to said probes, a null indicator coupled to said balancing circuit for denoting the absence of signal therein, a rotatably mounted shielded compartment supporting said probes for movement therewith and housing said balancing circuit, and a calibrated scale associated with said compartment for denoting the phase angle of said impedance.

18. The method of measuring the impedance at a point of reference comprising the steps of applying an alternating signal to said point, magnetically coupling a conductor to said signal at said point of reference to produce a first auxiliary signal, electrostatically coupling a conductor to said signal at said point of reference to produce a second auxiliary signal, attenuating at least one of said auxiliary signals until the magnitudes thereof are equal, measuring said attenuation to determine the magnitude of the impedance at said point of reference, and comparing the phase of said auxiliary signals to determine the angle of said impedance.

JOHN F. BYRNE.

REFERENCES CITED

The following references are of record in the file of this patent:

UNITED STATES PATENTS

| Number | Name | Date |
|---|---|---|
| 1,755,244 | Dietze | Apr. 22, 1930 |
| 2,198,371 | Wolferz et al. | Apr. 23, 1940 |
| 2,337,934 | Scheldorf | Dec. 28, 1943 |
| 2,367,965 | Rushing | Jan. 23, 1945 |
| 2,406,405 | Salisbury | Aug. 27, 1946 |
| 2,422,601 | Tashjian | June 17, 1947 |
| 2,442,606 | Korman | June 1, 1948 |
| 2,445,895 | Tyrrell | July 27, 1948 |
| 2,449,739 | Duttera | Sept. 21, 1948 |
| 2,456,679 | Cork et al. | Dec. 21, 1948 |
| 2,562,917 | Hoyt | Aug. 7, 1951 |

OTHER REFERENCES

Article entitled "A Method of Determining and Monitoring Power and Impedance at High Frequencies" by Morrison et al., presented at I. R. E. Convention March 3, 1947, five pages.